(12) United States Patent
Kim et al.

(10) Patent No.: US 12,240,612 B2
(45) Date of Patent: Mar. 4, 2025

(54) SYSTEM FOR RAISING INDOOR PRESSURE OF AIR MOBILITY

(71) Applicants: Hyundai Motor Company, Seoul (KR); Kia Corporation, Seoul (KR)

(72) Inventors: Jong Won Kim, Chungcheongnam-do (KR); Yoon Sic Nam, Daejeon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 422 days.

(21) Appl. No.: 17/701,134

(22) Filed: Mar. 22, 2022

(65) Prior Publication Data
US 2022/0388667 A1    Dec. 8, 2022

(30) Foreign Application Priority Data
Jun. 8, 2021    (KR) ................. 10-2021-0074010

(51) Int. Cl.
*B64D 13/06* (2006.01)
*B64D 13/02* (2006.01)
*B64D 13/08* (2006.01)

(52) U.S. Cl.
CPC ............ *B64D 13/06* (2013.01); *B64D 13/02* (2013.01); *B64D 13/08* (2013.01); *B64D 2013/064* (2013.01); *B64D 2013/0681* (2013.01)

(58) Field of Classification Search
CPC ........ B64D 13/02; B64D 13/08; B64D 13/06; B64D 2013/064; B64D 2013/0681
USPC .......................................... 454/76
See application file for complete search history.

(56) References Cited

U.S. PATENT DOCUMENTS

| | | | |
|---|---|---|---|
| 8,291,719 B2* | 10/2012 | Cowans | F25B 40/00 62/513 |
| 8,327,651 B2* | 12/2012 | Finney | B64D 13/08 62/510 |
| 9,878,593 B2* | 1/2018 | Hamamoto | B60H 1/3213 |
| 2007/0180852 A1* | 8/2007 | Sugiura | F25B 41/00 62/170 |
| 2021/0263492 A1* | 8/2021 | Kamei | A23B 7/0425 |

FOREIGN PATENT DOCUMENTS

KR    2019-0045789 A    5/2019

* cited by examiner

*Primary Examiner* — Avinash A Savani
*Assistant Examiner* — Dana K Tighe
(74) *Attorney, Agent, or Firm* — Fox Rothschild LLP

(57) ABSTRACT

A system for increasing an indoor pressure of an air mobility is provided. The system maintain the indoor pressure of the air mobility using an air conditioner provided in the air mobility without additional equipment and without increasing the weight of an airframe, thereby preventing external harmful gas from being introduced into the indoor space and thus ensuring the safety of a passenger.

12 Claims, 8 Drawing Sheets

SYSTEM FOR RAISING INDOOR PRESSURE OF AIR MOBILITY

CROSS-REFERENCE TO RELATED APPLICATION

This application claims the priority benefit of Korean Patent Application No. 10-2021-0074010, filed on Jun. 8, 2021, the disclosure of which is incorporated herein by reference.

BACKGROUND

1. Field of the Invention

The present invention relates to a system for increasing the indoor pressure of an air mobility, and more particularly to a system for increasing an indoor pressure of an air mobility, which is configured to maintain the indoor pressure of the air mobility using an air conditioner provided in the air mobility without additional equipment and without increasing the weight of an airframe, thereby preventing external harmful gases from being introduced into the indoor space and thus ensuring the safety of a passenger.

2. Description of the Related Art

Recently, air mobilities capable of being used in various fields such as luggage containers and medical transportation are being developed, and air mobilities having high energy efficiency have become sufficiently reliable to be practical use. A conventional aircraft such as an air mobility maintains the indoor pressure thereof using outdoor air introduced from a jet engine during high-speed flight at a high altitude. This is necessarily required in an aircraft in order to block the introduction of harmful gases into the indoor space when an external fire occurs during flight.

However, in the conventional case, since there is a need for various apparatuses to maintain the operational state of a power source relating to flight and a need for an additional pressure-increasing system to maintain the indoor pressure of an aircraft, there is a disadvantage of increased weight of the aircraft. Furthermore, since the system for increasing the indoor pressure is unable to be operated in the event of a fire at the power source, there is a problem whereby the indoor pressure is not maintained.

The details described as the background art are intended merely for the purpose of promoting an understanding of the background of the present invention, and should not be construed as an acknowledgment of the prior art that is already known to those of ordinary skill in the art.

SUMMARY

Therefore, the present invention provides a system for increasing the indoor pressure of an air mobility, which is configured to maintain the indoor pressure of the air mobility using an air conditioner provided in the air mobility without additional equipment and without increasing the weight of an airframe, thereby preventing external harmful gases from being introduced into the indoor space and thus ensuring the safety of a passenger.

In accordance with the present invention, the above and other objects can be accomplished by the provision of a system for increasing the indoor pressure of an air mobility that may include a refrigerant line, through which refrigerant is circulated and which includes a compressor, a condenser, an expander, and an evaporator, a first air line, which is connected to the refrigerant line upstream of the compressor via a first valve, branches therefrom, and is connected to an outside, a second air line, which is connected to the refrigerant line downstream of the compressor via a second valve, branches therefrom, and is connected to the indoor space, a third valve, which is provided at the second air line to allow refrigerant or air, which flows in the second air line, to selectively flow to the outside or the indoor space, and a controller, which, when the condition of the air mobility is abnormal, operates the first and second valves to allow outdoor air to flow into the first air line, the refrigerant line, and the second air line by virtue of activation of the compressor and controls the third valve to allow discharging of the refrigerant to the outside and then to allow air to flow into the indoor space after completion of discharge of the refrigerant.

The first air line may be connected at a first end thereof to the refrigerant line via the first valve, and may be connected at a second end thereof to an air inlet, through which air is selectively introduced under the control of the controller. The air inlet may be normally maintained in a closed state, and may be opened when the controller receives information that the condition of the air mobility is abnormal.

The second air line may be connected at a first end thereof to the refrigerant line downstream of the condenser via the second valve and at a second end thereof to the indoor space. The second air line may be provided with a gas-liquid separator configured to separate refrigerant from air.

The first air line may be provided with a first oxygen sensor, and the second air line may be provided with a second oxygen sensor upstream of the third valve, wherein the controller may be configured to compare oxygen concentrations input from the first and second oxygen sensors with each other to control opening and closing of the third valve. When the oxygen concentration input from the second oxygen sensor is less than the oxygen concentration input from the first oxygen sensor by a predetermined value or more, the controller may be configured to operate the third valve to allow the refrigerant and air flowing in the second air line to be discharged to the outside. When the condition of the air mobility is normal and cooling of the indoor space is required, the controller may be configured to operate the first and second valves to allow cool air to be created through the evaporator.

The system may further include a heat pump line, which is connected to the refrigerant line downstream of the compressor via a fourth valve and may include an internal heat exchanger, and a heat pump expander disposed at the refrigerant line between the internal heat exchanger and the condenser. When the condition of the air mobility is normal and heating of the indoor space is required, the controller may be configured to operate the first valve, the second valve, and the fourth valve to allow the refrigerant to circulate through the refrigerant line and the heat pump line, thereby creating heated air through the internal heat exchanger.

When the condition of the air mobility is abnormal, the controller may be configured to operate the first valve, the second valve, and the fourth valve to allow outdoor air to flow into the first air line, the refrigerant line, and the second air line, and operate the third valve to allow discharging of the refrigerant to the outside and then to allow air to flow into the indoor space after completion of discharge of the refrigerant. When the controller receives information that the indoor pressure is lowered, the controller may perform control to increase the driving amount of the compressor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Reference will now be made in detail to exemplary embodiments of the present invention, examples of which are illustrated in the accompanying drawings. Wherever possible, the same reference numbers will be used throughout the drawings to refer to the same or like parts.

Hereinafter, a system for increasing the indoor pressure of an air mobility according to an exemplary embodiment of the present invention will be described with reference to the accompanying drawings.

Figure 1:
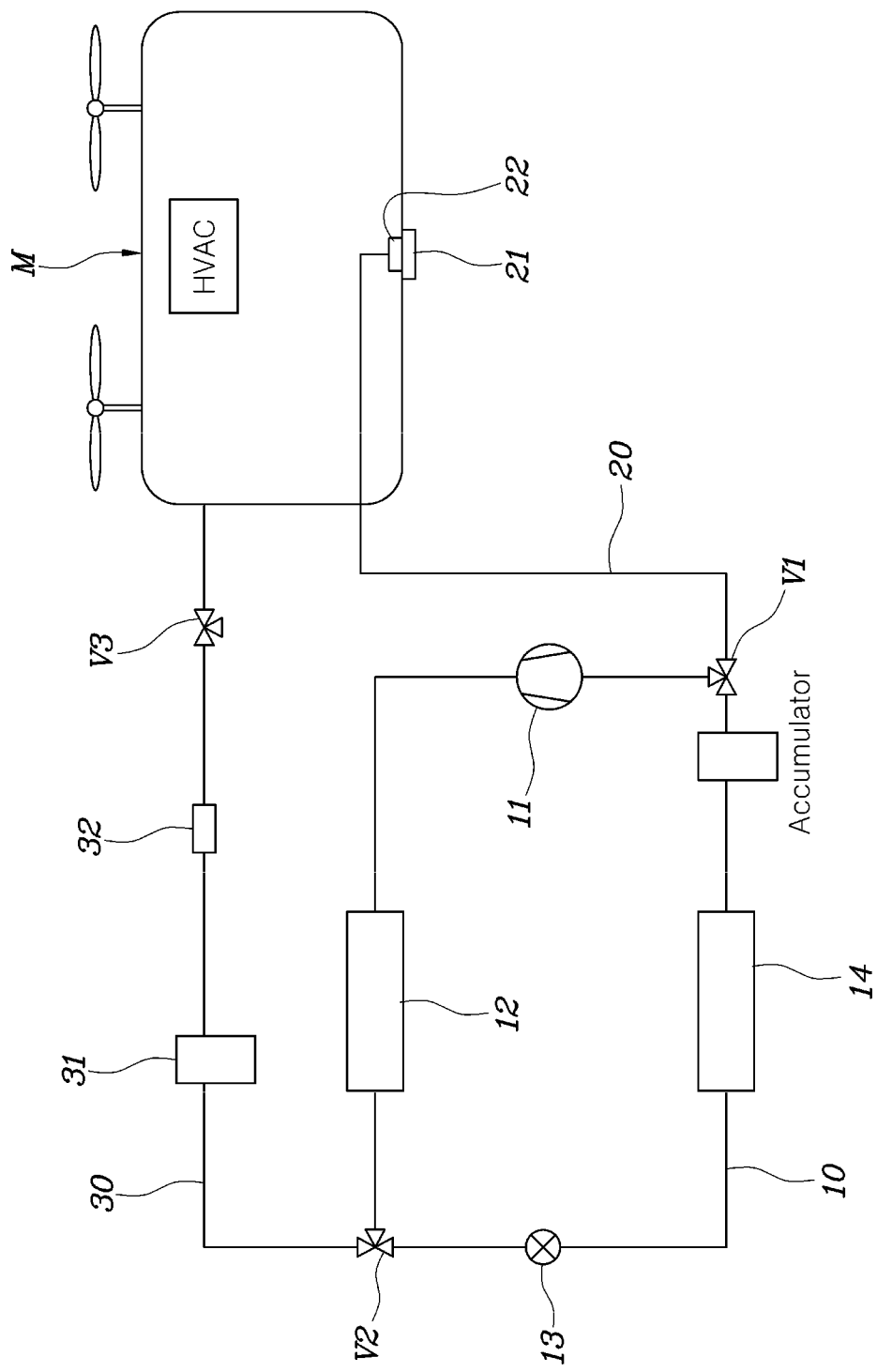
FIG. 1 is a view illustrating a system for increasing the indoor pressure of an air mobility according to an embodiment of the present invention.
Figure 2:
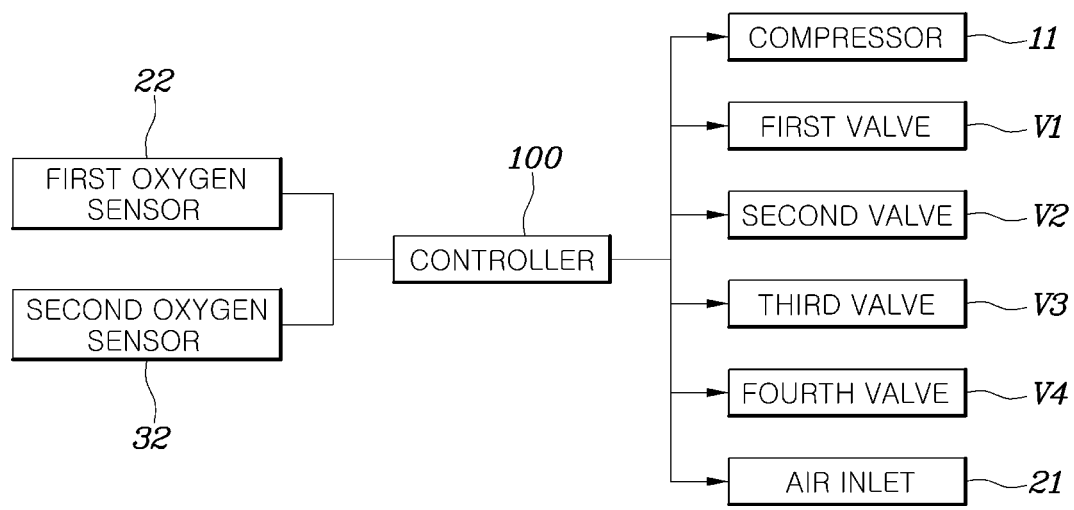
FIG. 2 is a view illustrating the construction of the system for increasing the indoor pressure of an air mobility shown in FIG. 1.
Figure 3:
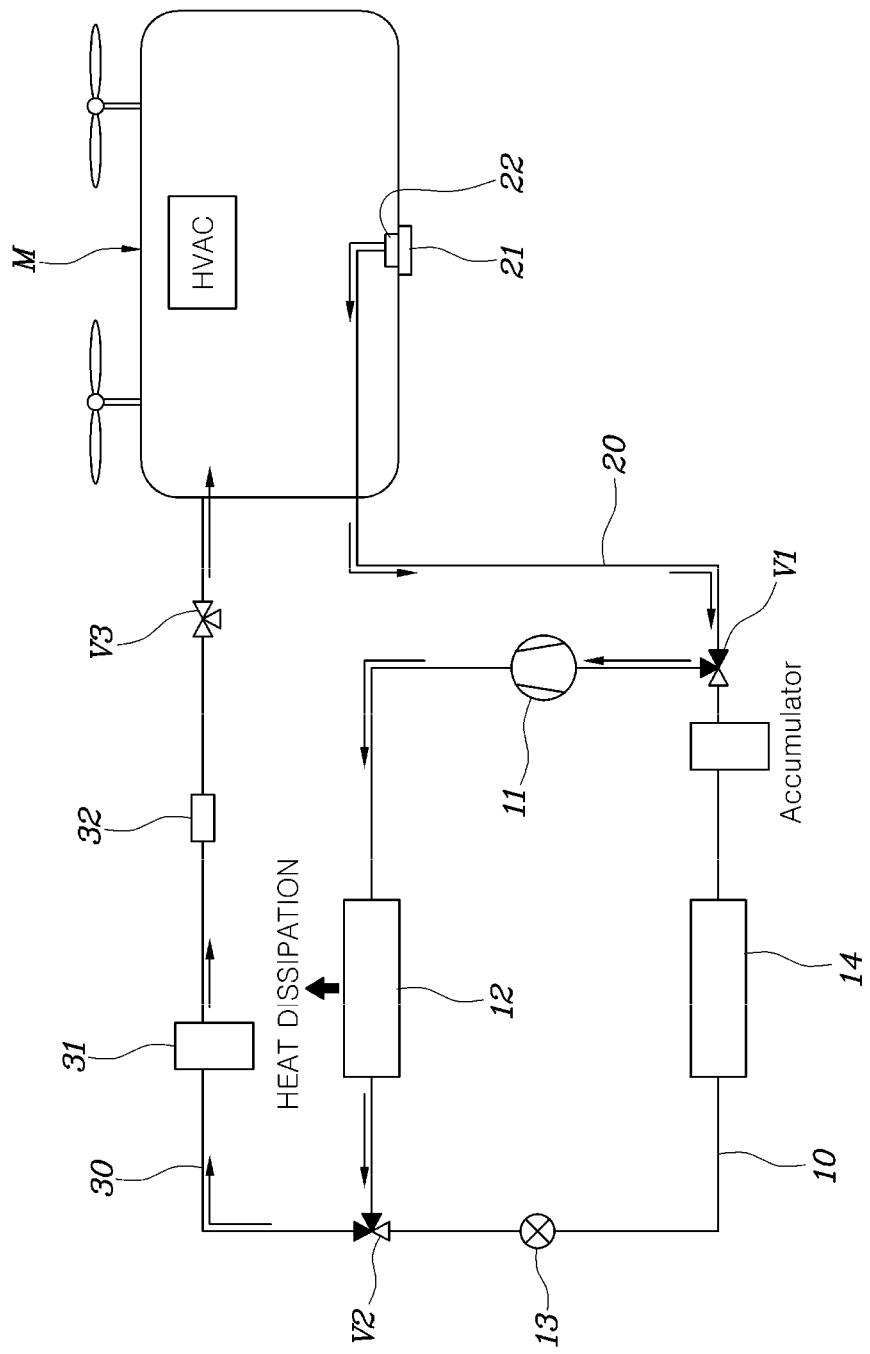
FIG. 3 is a view illustrating an operation of increasing the indoor pressure of the air mobility shown in FIG. 1.
Figure 4:
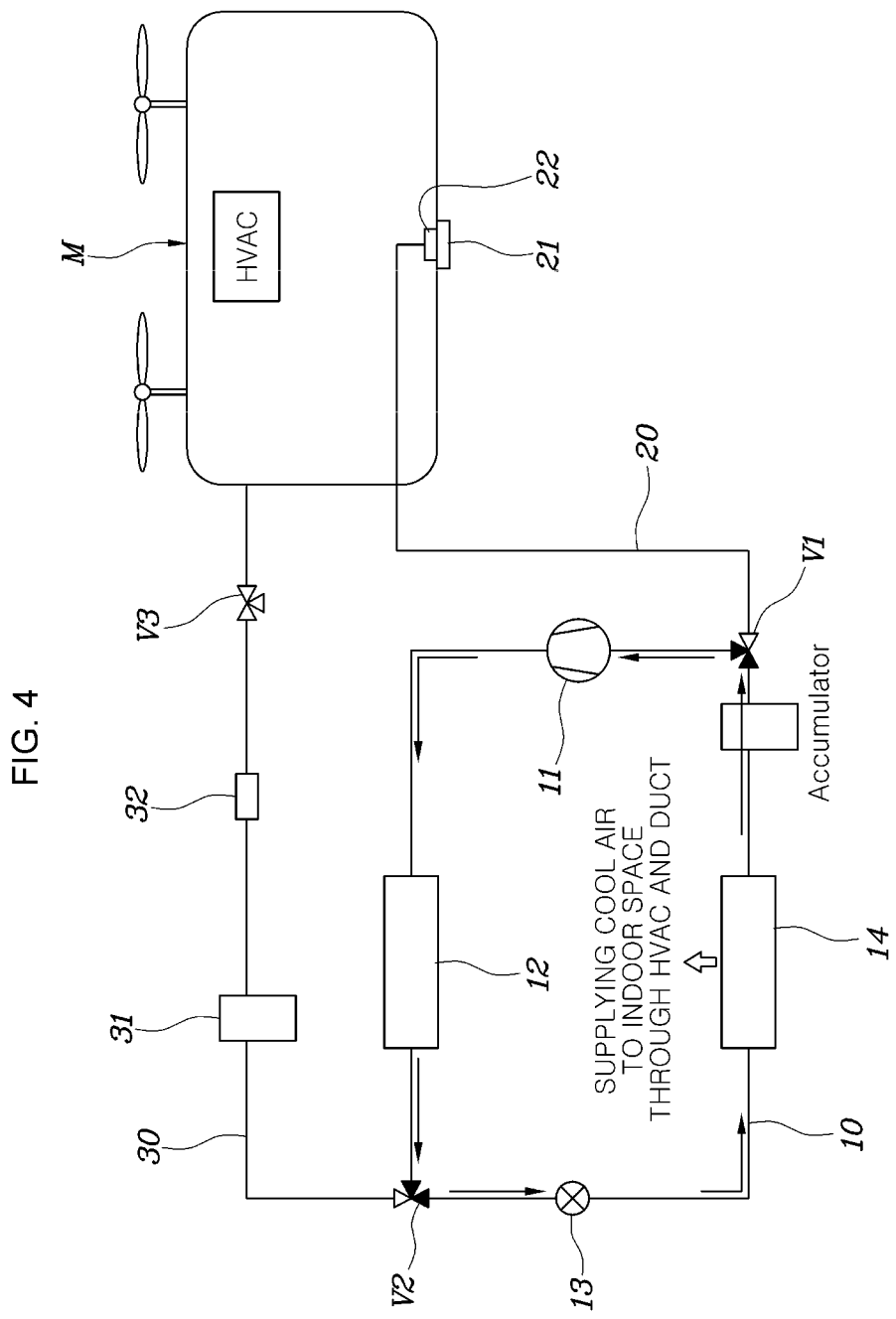
FIG. 4 is a view illustrating an operation of cooling the indoor space of the air mobility shown in FIG. 1.
Figure 5:
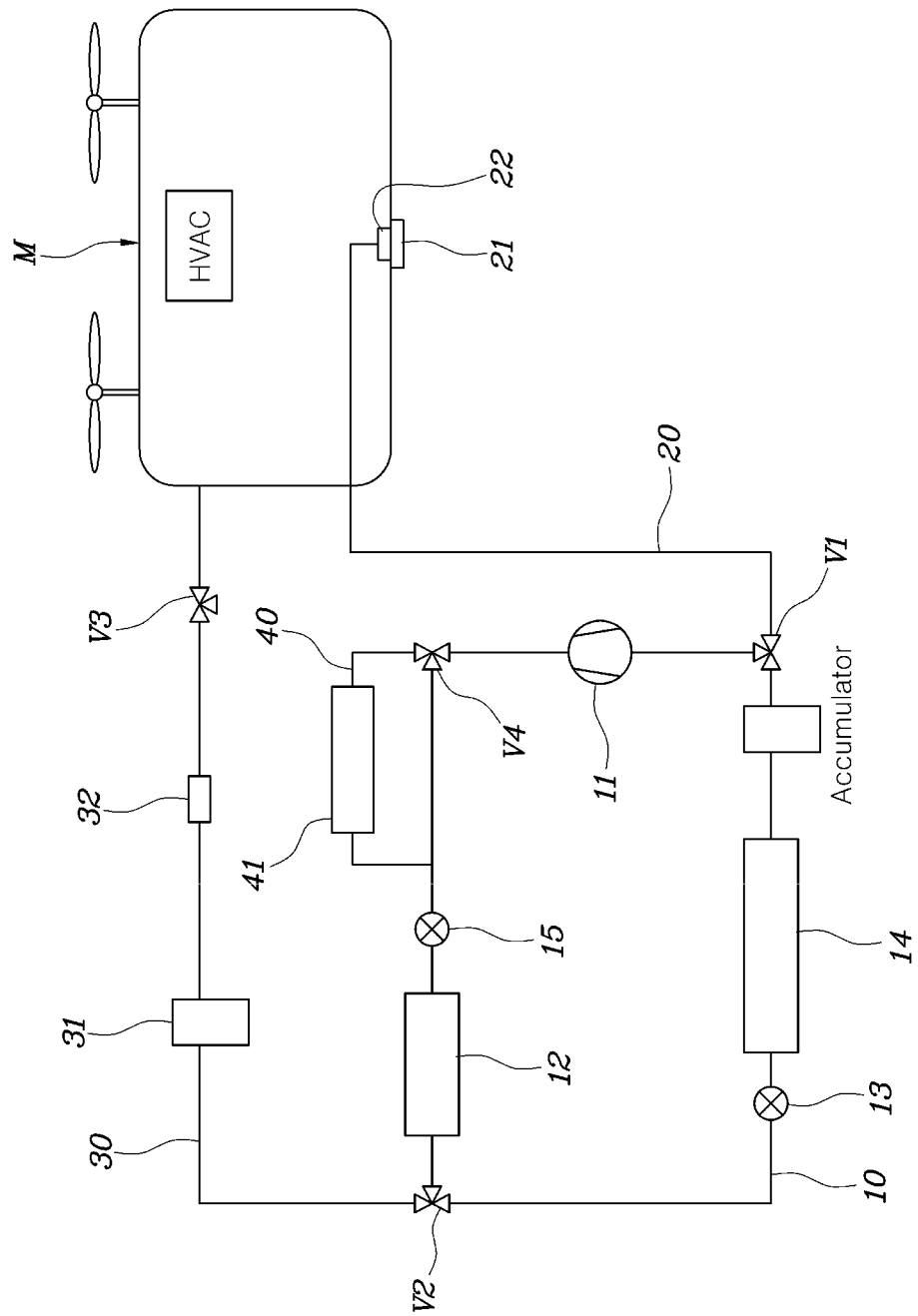
FIG. 5 is a view illustrating a system for increasing the indoor pressure of an air mobility according to another embodiment of the present invention.
Figure 6:
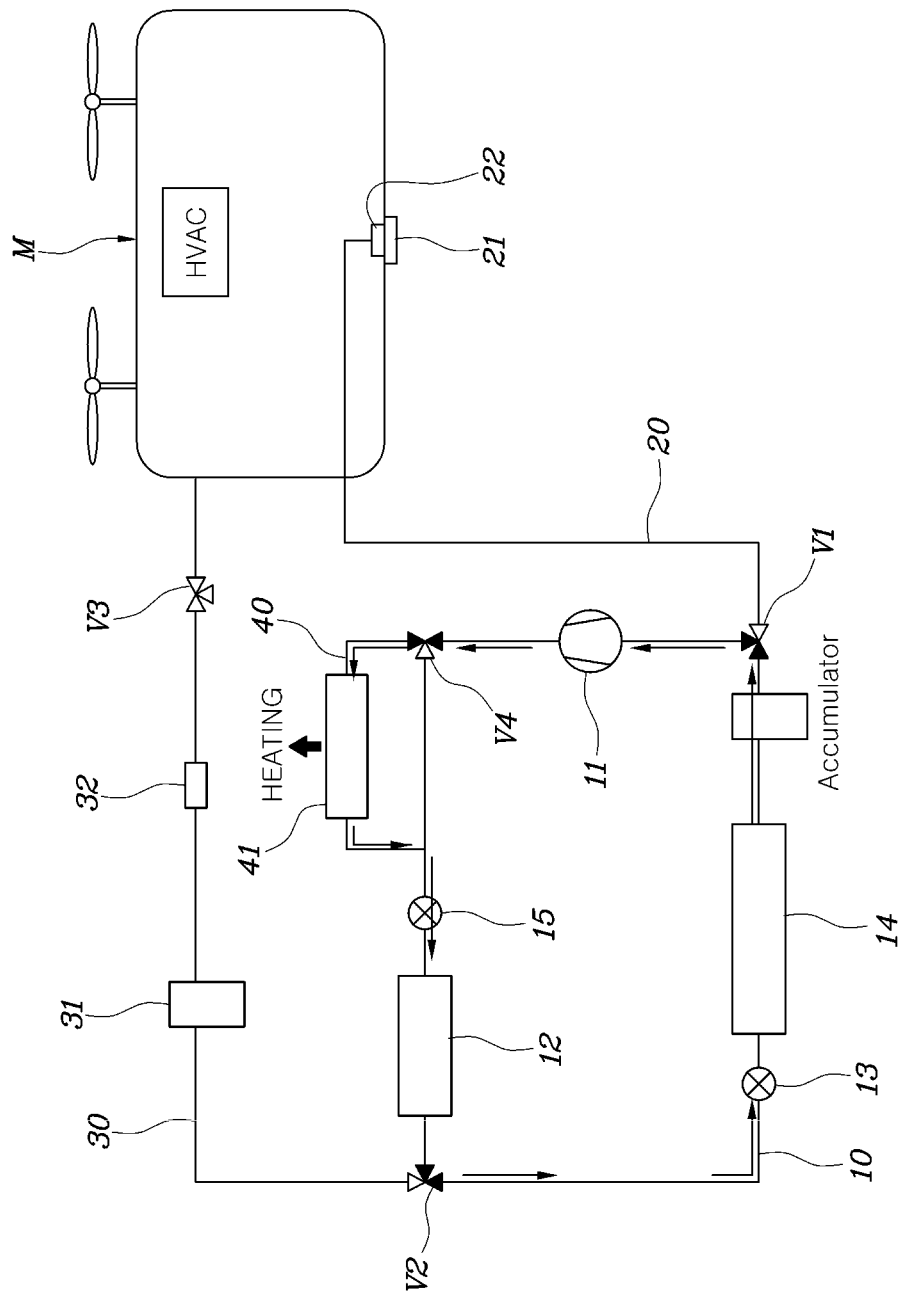
FIG. 6 is a view illustrating an operation of heating the indoor space of the air mobility shown in FIG. 5.
Figure 7:
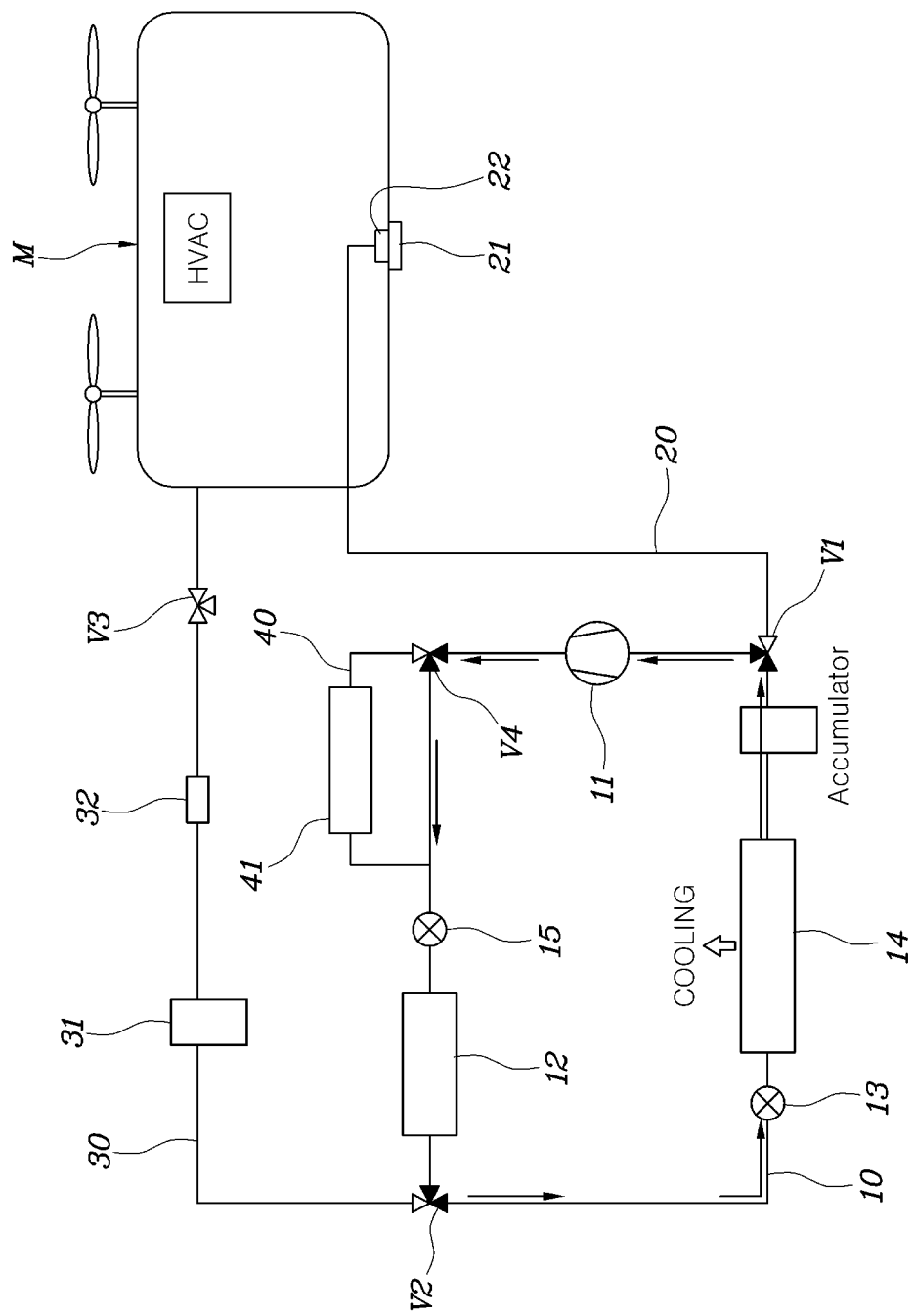
FIG. 7 is a view illustrating an operation of cooling the indoor space of the air mobility shown in FIG. 5.
Figure 8:
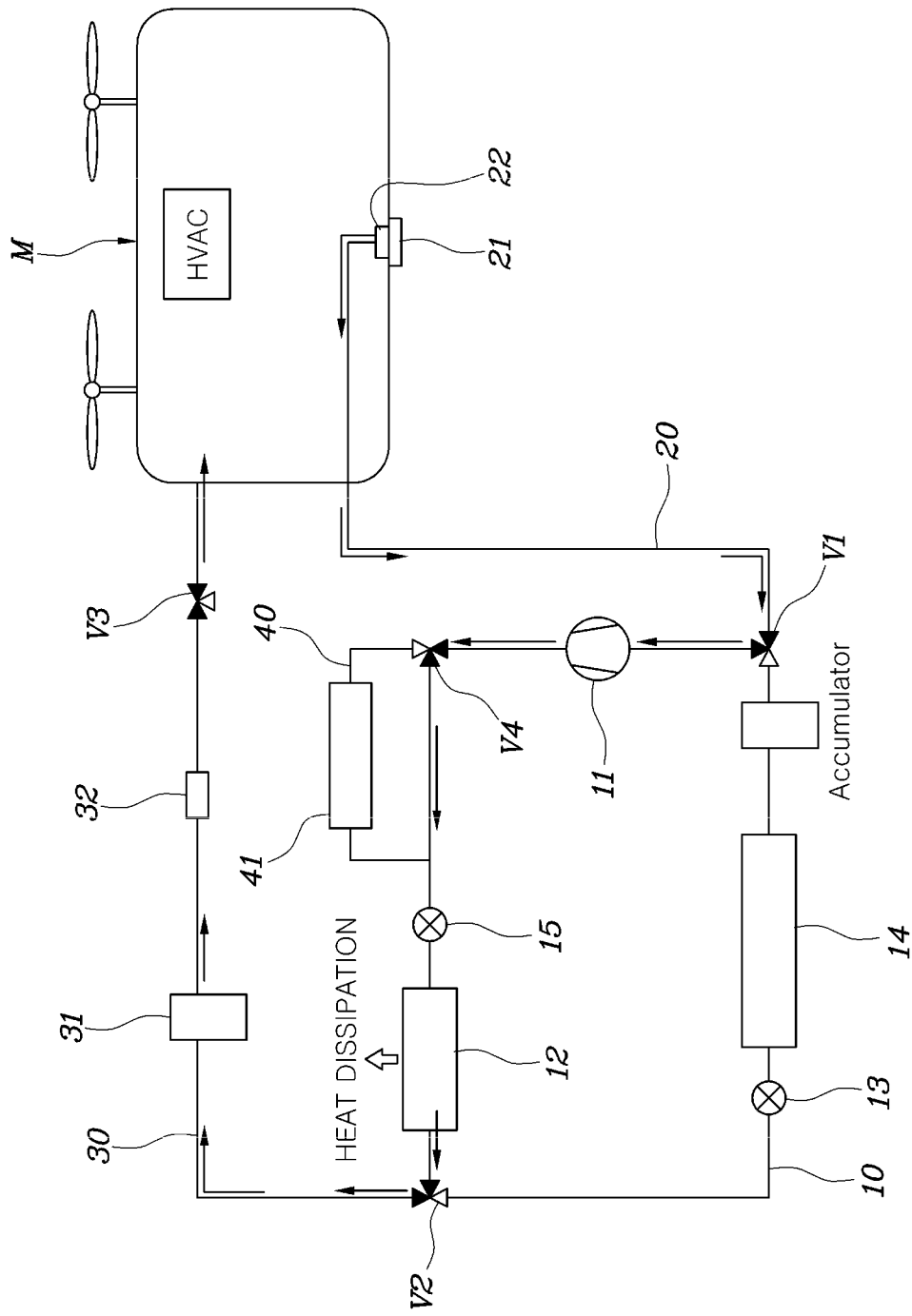
FIG. 8 is a view illustrating an operation of increasing the indoor pressure of the air mobility shown in FIG. 5.

FIG. 1 is a view illustrating a system for increasing the indoor pressure of an air mobility according to an embodiment of the present invention. FIG. 2 is a view illustrating the construction of the system for increasing the indoor pressure of the air mobility shown in FIG. 1. FIG. 3 is a view illustrating an operation of increasing the indoor pressure of the air mobility shown in FIG. 1. FIG. 4 is a view illustrating an operation of cooling the indoor space of the air mobility shown in FIG. 1. FIG. 5 is a view illustrating a system for increasing the indoor pressure of an air mobility according to another embodiment of the present invention. FIG. 6 is a view illustrating an operation of heating the indoor space of the air mobility shown in FIG. 5. FIG. 7 is a view illustrating an operation of cooling the indoor space of the air mobility shown in FIG. 5. FIG. 8 is a view illustrating an operation of increasing the indoor pressure of the air mobility shown in FIG. 5.

As illustrated in FIGS. 1 and 2, the system for increasing the indoor pressure of an air mobility according to an embodiment of the present invention may include a refrigerant line 10, through which refrigerant is circulated and which includes a compressor 11, a condenser 12, an expander 13, and an evaporator 14, a first air line 20, which is connected to the refrigerant line 10 upstream of the compressor 11 via a first valve V1 and is branched therefrom and which is connected to the outside, a second air line 30, which is connected to the refrigerant line 10 downstream of the compressor 11 via a second valve V2 and is branched therefrom and which is connected to an indoor space, a third valve V3, which is provided at the second air line 30 to allow the refrigerant or air, which flows in the second air line 30, to selectively flow to the outside or the indoor space, and a controller 100, which, in response to receiving information that the condition of the air mobility M is abnormal, is configured to operate the first valve V1 and the second valve V2 to allow outdoor air to flow into the first air line 20, the refrigerant line 10, and the second air line 30 by virtue of activation of the compressor 11, and operate the third valve V3 to allow discharging of the refrigerant to the outside and then to allow the air to flow into the indoor space after completion of the discharging of the refrigerant.

In particular, the compressor 11 and the individual valves are operated by the controller 100. The controller 100 may be configured to operate the individual valves to supply conditioned air to the indoor space or to maintain the indoor pressure based on the desired temperature of the indoor space or on whether the condition of the air mobility M is abnormal. The refrigerant line 10 is constructed such that the refrigerant cools air while circulating through the compressor 11, the condenser 12, the expander 13, and the evaporator 14, and the cooled air is supplied to the indoor space.

The first air line 20 is connected at a first end thereof to the refrigerant line 10 upstream of the compressor 11 via the first valve V1 and at a second end thereof to the outside. Consequently, in a normal environment, the refrigerant is normally circulated in the refrigerant line 10, and outdoor air is supplied to the refrigerant line 10 through the first air line 20 by virtue of activation of the compressor 11 when the first valve V1 is opened by the controller 100.

Meanwhile, the second air line 30 is connected at a first end thereof to the refrigerant line 10 downstream of the compressor 11 via the second valve V2 and at a second end thereof to the indoor space in the air mobility M. Consequently, in a normal environment, the refrigerant is normally circulated in the refrigerant line 10, and the air, which is supplied to the first air line 20 and the refrigerant line 10, flows to the indoor space by virtue of activation of the compressor 11 when the second valve V2 is opened by the controller 100.

As a result, the present invention is capable of maintaining the indoor pressure by supplying air to the indoor space through the first air line 20 and the second air line 30 using the refrigerant line 10 configured to supply conditioned air. However, because the refrigerant circulating in the refrigerant line 10 is harmful gas, filtering, which is configured to discharge the refrigerant to the outside while air flows to the indoor space through the refrigerant line 10, is necessarily required. Accordingly, since the system according to the embodiment of the present invention provides the second air line 30 with the third valve V3, the refrigerant or the air that flows in the second air line 30 selectively flows to the outside or the indoor space based on the opening or closing action of the third valve V3.

Consequently, when the controller 100 receives information that the condition of the air mobility M is abnormal, the controller 100 may be configured to operate the first valve V1, the second valve V2, and the third valve V3 to allow the air to flow to the indoor space in the air mobility M through the first air line 20, the refrigerant line 10, and the second air line 30. Specifically, the controller 100 may be configured to determine whether the condition of the air mobility M is abnormal by various sensors. In particular, the abnormal condition of the air mobility M may be considered to be the occurrence of a fire in the air mobility M.

When the controller 100 determines that the condition of the air mobility is abnormal, the controller 100 may be configured to determine the first valve V1 and the second valve V2 to allow outdoor air to flow to the first air line 20, the refrigerant line 10, and the second air line 30 by virtue of activation of the compressor 11. Particularly, because the refrigerant circulating in the refrigerant line 10, may flow to the indoor space while the air flows into the indoor space through the first air line 20, the refrigerant line 10, and the second air line 30 under the control of the controller 100 when the condition of the air mobility M is abnormal, the controller 100 allows the refrigerant to be discharged to the outside through the third valve V3 in the initial stage. Thereafter, when the discharge of the refrigerant is completed, the controller 100 may be configured to operate the third valve V3 to allow the air flowing in the second air line 30 to flow into the indoor space. At this point, the air, from which the refrigerant is removed, flows into the indoor space, the indoor pressure is maintained, and higher safety of a passenger is ensured by virtue of removal of the harmful refrigerant.

The system according to the embodiment of the present invention will now be described in more detail. The first air line 20 is connected at a first end thereof to the refrigerant line 10 via the first valve V1 and at a second end thereof to an air inlet 21, through which air is selectively introduced under the control of the controller 100. In particular, the air inlet 21 may be configured to allow air to be selectively introduced under the control of the controller 100, and may be provided at the front of the air mobility M such that outdoor air is easily introduced into the first air line 20 through the air inlet 21.

Accordingly, the air inlet 21 is maintained in the closed state when the air mobility M is in the normal state, and is opened to allow air to be introduced into the first air line 20 therethrough when a signal indicating an abnormal state of the air mobility M is input to the controller 100. In other words, when the first valve V1 is opened toward the refrigerant line 10 from the first air line 20 and the air inlet 21 is open, the air flows into the refrigerant line 10 through the first air line 20.

Meanwhile, the second air line 30 is connected at a first end thereof to the refrigerant line 10 downstream of the condenser 12 via the second valve BV2 and is connected at a second end thereof to the indoor space. In other words, since the first end of the second air line 30 is connected to the refrigerant line 10 downstream of the condenser 12, the high-temperature air that has passed through the compressor 11 is cooled while passing through the condenser 12. Accordingly, there is no case in which a passenger in the indoor space otherwise feels an unpleasant sensation caused by the high-temperature air that has passed through the compressor 11.

Therefore, when the second valve V2 is opened toward the second air line 30, the air that has passed through the first air line 20 and the refrigerant line 10 by virtue of activation of the compressor 11 flows into the indoor space in the air mobility M through the second air line 30. At this point, since the first end of the second air line 30 is connected to the refrigerant line 10 downstream of the condenser 12, the high-temperature air that has passed through the compressor 11 is cooled, thereby preventing discomfort to a passenger that would otherwise be caused by the heat of the air.

The second air line 30 is provided with a gas-liquid separator 31, which is configured to separate air from refrigerant. In other words, since the air, which is raised in pressure in the compressor 11, needs to be separated from the residual refrigerant in the refrigerant line 10, the second air line 30 is provided with the gas-liquid separator 31. The gas-liquid separator 31 may employ cyclone centrifugal separation using the difference in density between air and refrigerant and high-speed/high-pressure energy, and may additionally separate foreign substances from the introduced air. Accordingly, since the air that flows in the second air line 30 is filtered to remove refrigerant and foreign substances from the air, it is possible to supply safe air, from which the refrigerant and the foreign substances have been removed, to the indoor space.

The first air line 20 may include a first oxygen sensor 22, and the second air line 30 may include a second oxygen sensor 32 upstream of the third valve V3. The controller 100 may be configured to compare the oxygen concentrations input from the first oxygen sensor 22 and a second oxygen sensor 32 with each other, and control opening and closing actions of the third valve V3 depending on the oxygen concentrations. The first oxygen sensor 22 and the second oxygen sensor 32 may be configured to check for the presence of refrigerant in the air flowing into the indoor space through the second air line 30.

In other words, since the air that does not pass through the refrigerant line 10 flows into the first air line 20, it may be possible to check the reference oxygen concentration, which is necessary to check for the presence of refrigerant, by means of the first oxygen sensor 22. Furthermore, since air that contains therein refrigerant while passing through the refrigerant line 10 flows into the second air line 30, it may be possible to check the oxygen concentration, which is necessary to check for the presence of refrigerant, by the second oxygen sensor 32.

Consequently, the controller 100 may be configured to compare the oxygen concentrations input from the first oxygen sensor 22 and the second oxygen sensor 32, with each other, and determine that refrigerant is contained in the air when the oxygen concentration measured at the second oxygen sensor 32 is less than the oxygen concentration measured at the first oxygen sensor 22. Furthermore, the controller 100 may be configured to determine that the air that has passed through the refrigerant line 10 does not contain refrigerant when the oxygen concentration measured at the second oxygen sensor 32 is almost equal to the oxygen concentration measured at the first oxygen sensor 22.

Accordingly, when the oxygen concentration measured at the second oxygen sensor 32 is less than the oxygen concentration measured at the first oxygen sensor 22 by a predetermined value or more, the controller 100 may be configured to operate the third valve V3 to discharge the refrigerant and the air flowing in the second air line 30 to the outside. In particular, the reference concentration, which is previously stored in the controller 100, may be set through experimentation to determine a range of content of refrigerant contained in the air that is considered a harmful.

Consequently, when the state of the air mobility M is abnormal, the controller 100 may be configured to operate the first valve V1 and the second valve V2 to allow outdoor air to flow into the first air line 20, the refrigerant line 10, and the second air line 30 by virtue of activation of the compressor 11. When the oxygen concentration measured at the second oxygen sensor 32 is less than the oxygen concentration measured at the first oxygen sensor 22 by the predetermined value, the controller 100 may be configured to operate the third valve V3 to allow the refrigerant and air flowing in the second air line 30 to be discharged to the outside, thereby preventing the air containing therein the refrigerant from flowing into the indoor space.

Subsequently, when the difference between the oxygen concentration measured at the second oxygen sensor 32 and the oxygen concentration measured at the first oxygen sensor 22 is within a predetermined range, the controller 100 may be configured to determine that the air flowing in the second air line 30 does not contain refrigerant therein, and operate the third valve V3 to allow the air flowing in the second air line 30 to flow into the indoor space. As described above, according to the embodiment of the present invention, when the condition of the air mobility M is abnormal, it may be possible to allow outdoor air to flow into the indoor space to thus maintain the indoor pressure, as illustrated in FIG. 3.

Specifically, the controller 100 may be configured to operate the first valve V1 and the second valve V2 to allow outdoor air to flow into the first air line 20, the refrigerant line 10, and the second air line 30 by virtue of activation of the compressor 11 and operate the third valve V3 to allow discharging of the refrigerant to the outside and then to allow the air to flow into the indoor space after completion of discharge of the refrigerant, thereby making it possible to maintain the indoor pressure. This is the control according to an abnormal condition of the air mobility, and the control is not performed when the air mobility is in the normal condition.

Meanwhile, when the condition of the air mobility M is normal and indoor cooling is required, the conditioned air, which will be supplied to the indoor space, is cooled using the refrigerant circulating in the refrigerant line 10, and outdoor air does not flow into the indoor space through the refrigerant line 10, as illustrated in FIG. 4. In other words, when the condition of the air mobility M is normal and indoor cooling is required, the controller 100 may be configured to operate the first valve V1 to interrupt the connection between the first air line 20 and the refrigerant line 10 and operate the second valve V2 to interrupt the connection between the refrigerant line 10 and the second air line 30. Consequently, the refrigerant is circulated along the refrigerant line 10 through the compressor 11, the condenser 12, the expander 13, and the evaporator 10, and cool air is generated at the condenser 14 and is supplied to the indoor space through an HVAC and a duct.

As illustrated in FIG. 5, the system according to the embodiment of the present invention may further include a heat pump line 40, which is connected to the refrigerant line 10 downstream of the compressor 11 via a fourth valve V4 and includes an internal heat exchanger 41, and a heat pump expander 15 provided at the refrigerant line 10 between the internal heat exchanger 41 and the condenser 12.

The heat pump line 40, the fourth valve V4, the internal heat exchanger 41, and the heat pump expander 15 are components configured to constitute a heat pump to improve the efficiency of air conditioning. In particular, the internal heat exchanger 41, which is provided to supply heat to the indoor space, heats the air using the high-temperature refrigerant that has passed through the compressor 11 to create heated air. The heating air, which is created by the internal heat exchanger 41, is supplied to the indoor space through the HVAC and the duct.

In other words, when the condition of the air mobility M is normal and heating of the indoor space is required, the controller 100 may be configured to operate the first valve V1 to interrupt the connection between the first air line 20 and the refrigerant line 10 and operate the second valve V2 to interrupt the connection between the refrigerant line 10 and the second air line 30, as illustrated in FIG. 7. Furthermore, the controller 100 may be configured to operate the fourth valve V4 to connect the refrigerant line 10 to the heat pump line 40 to thus allow the refrigerant to circulate along the refrigerant line 10 and the heat pump line 40, whereby the high-temperature refrigerant that has passed through the compressor 11 exchanges heat with air, thereby creating heating air.

Subsequently, the refrigerant that has passed through the internal heat exchanger 41 is expanded by the heat pump expander 15, and flows through the condenser 12, the expander 13, and the evaporator 14 while performing heat exchange, thereby improving thermal efficiency. When the state of the controller 100 is normal and cooling of the indoor space is required, the controller 100 may be configured to operate the first valve V1 to interrupt the connection between the first air line 20 and the refrigerant line 10 and controls the second valve V2 to interrupt the connection between the refrigerant line 10 and the second air line 30, as illustrated in FIG. 7. Furthermore, the controller 100 may be configured to operate the fourth valve V4 to interrupt the connection between the refrigerant line 10 and the heat pump line 40 and open the heat pump expander 15.

Consequently, the refrigerant in the refrigerant line 10 is circulated through the compressor 11, the condenser 12, the expander 13, and the evaporator 14, thereby creating cooled air at the evaporator 14, and the cooled air is supplied to the indoor space through the HVAC and the duct. Meanwhile, when the condition of the air mobility M is abnormal, the controller 100 may be configured to operate the first valve V1, the second valve V2, and the fourth valve V4 to allow outdoor air to flow into the first air line 20, the refrigerant line 10, and the second air line 11 by virtue of activation of the compressor 11 and operate the third valve V3 to allow discharging of the refrigerant to the outside and then to allow the air to flow into indoor space after completion of discharge of the refrigerant, as illustrated in FIG. 8.

In other words, the controller 100 may be configured to operate the first valve V1, the second valve V2, and the fourth valve V4 to allow outdoor air to flow into the first air line 20, the refrigerant line 10, and the second air line 30 by virtue of activation of the compressor 11, and operate the third valve V3 to allow discharging of the refrigerant to the outside and then to allow the air to flow into the indoor space after completion of the discharging of the refrigerant, thereby maintaining the indoor pressure.

When the controller 100 receives information that the indoor pressure is reduced, the controller 100 may be configured to increase the driving capacity of the compressor 11. In other words, the controller 100 may be configured to receive information about the indoor pressure from the sensor provided in the indoor space. When the controller 100 receives information that the indoor pressure is reduced due to an abnormal state of the air mobility M, the controller 100 may be configured to increase the driving amount of the compressor 11 to thus increase the amount of air flowing into the indoor space. Consequently, the indoor pressure is maintained, thereby preventing external harmful gases from being introduced into the indoor space.

As is apparent from the above description, the system for increasing the indoor pressure of an air mobility according to the present invention is configured to maintain the indoor pressure of the air mobility using an air conditioner provided in the air mobility without additional equipment and without increasing the weight of an airframe, thereby preventing external harmful gas from being introduced into the indoor space and thus ensuring the safety of a passenger.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for increasing an indoor pressure of an air mobility comprising:
    a refrigerant line, through which refrigerant is circulated and which includes a compressor, a condenser, an expander, and an evaporator;
    a first air line, which is connected to the refrigerant line upstream of the compressor via a first valve, branches therefrom, and is connected to an outside;
    a second air line, which is connected to the refrigerant line downstream of the compressor via a second valve, branches therefrom, and is connected to an indoor space;
    a third valve, which is provided at the second air line to allow the refrigerant or air that flows in the second air line to selectively flow to the outside or the indoor space; and
    a controller, which, when a state of the air mobility is abnormal, is configured to operate the first and second valves to allow outdoor air to flow into the first air line, the refrigerant line, and the second air line by virtue of activation of the compressor and operate the third valve to allow discharging of the refrigerant to the outside and then to allow the outdoor air to flow into the indoor space after completion of the discharging of the refrigerant.

2. The system according to claim 1, wherein the first air line is connected at a first end thereof to the refrigerant line via the first valve, and is connected at a second end thereof to an air inlet, through which the outdoor air is selectively introduced under the control of the controller.

3. The system according to claim 2, wherein the air inlet is normally maintained in a closed state, and is opened when the controller receives information that the state of the air mobility is abnormal.

4. The system according to claim 1, wherein the second air line is connected at a first end thereof to the refrigerant line downstream of the condenser via the second valve and at a second end thereof to the indoor space.

5. The system according to claim 1, wherein the second air line is provided with a gas-liquid separator configured to separate the refrigerant from the outdoor air.

6. The system according to claim 1, wherein the first air line is provided with a first oxygen sensor and the second air line is provided with a second oxygen sensor upstream of the third valve, and
    wherein the controller is configured to compare oxygen concentrations input from the first and second oxygen sensors with each other to control opening and closing of the third valve.

7. The system according to claim 6, wherein, when the oxygen concentration input from the second oxygen sensor is less than the oxygen concentration input from the first oxygen sensor by a predetermined value or greater, the controller is configured to operate the third valve to allow the refrigerant and the outdoor air that flow in the second air line, to be discharged to the outside.

8. The system according to claim 1, wherein, when the state of the air mobility is normal and cooling of the indoor space is required, the controller is configured to operate the first and second valves to allow cool air to be created at the evaporator.

9. The system according to claim 1, further comprising:
    a heat pump line, which is connected to the refrigerant line downstream of the compressor via a fourth valve and includes an internal heat exchanger; and
    a heat pump expander provided at the refrigerant line between the internal heat exchanger and the condenser.

10. The system according to claim 9, wherein, when the state of the air mobility is normal and heating of the indoor space is required, the controller is configured to operate the first valve, the second valve, and the fourth valve to allow the refrigerant to be circulated through the refrigerant line and the heat pump line, thereby creating heated air through the internal heat exchanger.

11. The system according to claim 9, wherein, when the state of the air mobility is abnormal, the controller is configured to operate the first valve, the second valve, and the fourth valve to allow the outdoor air to flow into the first air line, the refrigerant line, and the second air line, and controls the third valve to allow discharging of the refrigerant to the outside and then to allow the outdoor air to flow into the indoor space after completion of the discharging of the refrigerant.

12. The system according to claim 1, wherein, when the controller receives information that the indoor pressure is reduced, the controller is configured to increase a driving amount of the compressor.

* * * * *